April 8, 1969     E. H. PERRY     3,437,085
SELF-CLEANING GAS OVEN SYSTEM AND GAS BURNER MEANS THEREFOR
Filed March 1, 1967     Sheet 1 of 3
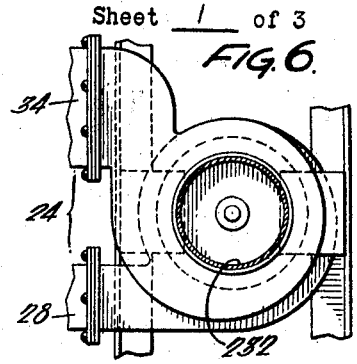
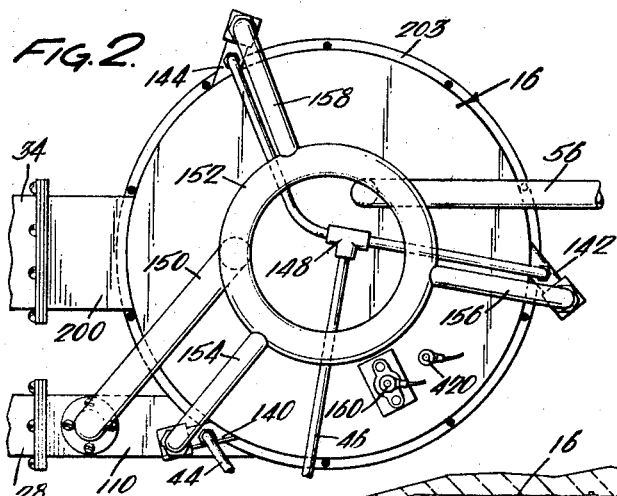
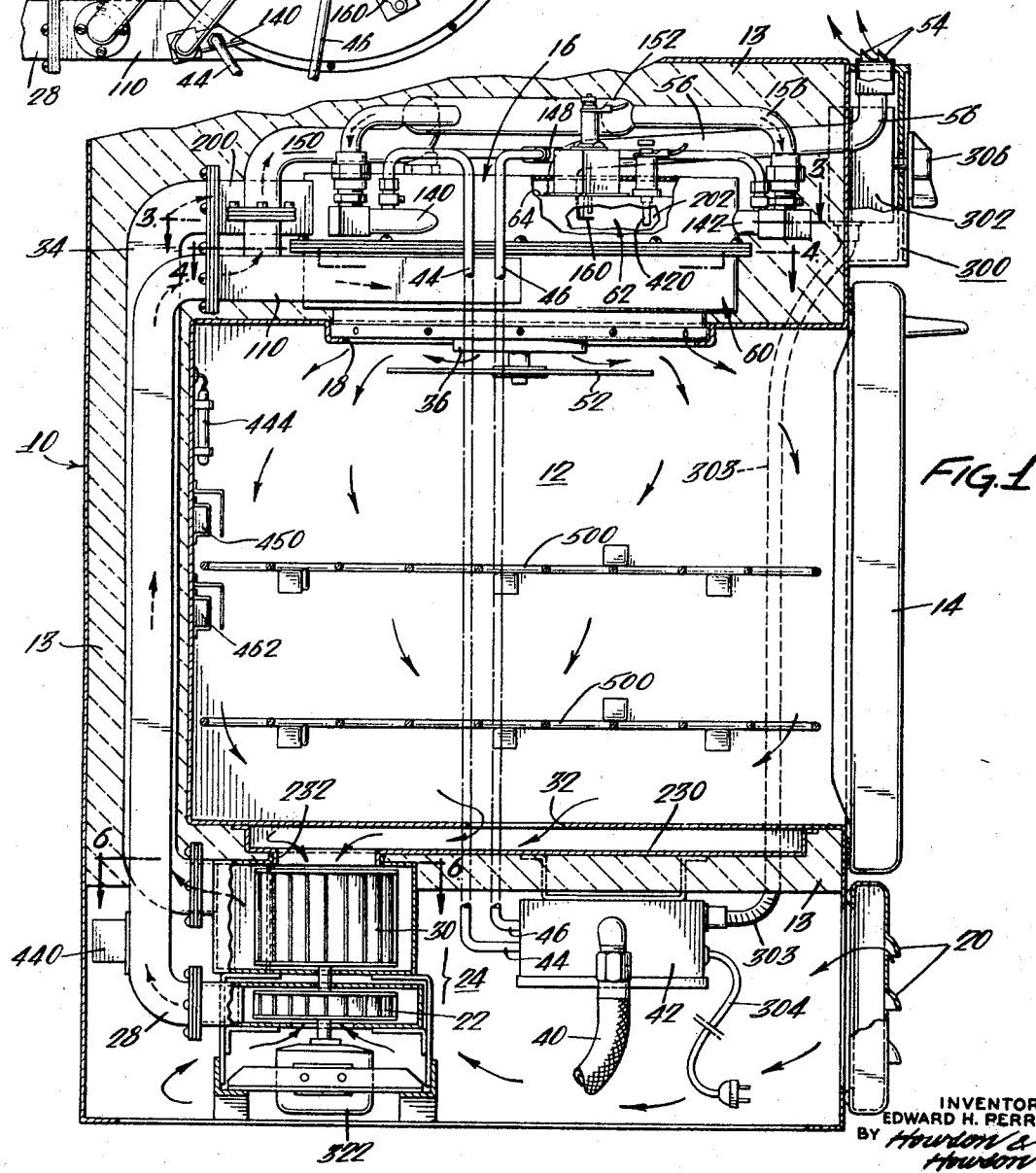
INVENTOR:
EDWARD H. PERRY
BY Howson & Howson
ATTYS.

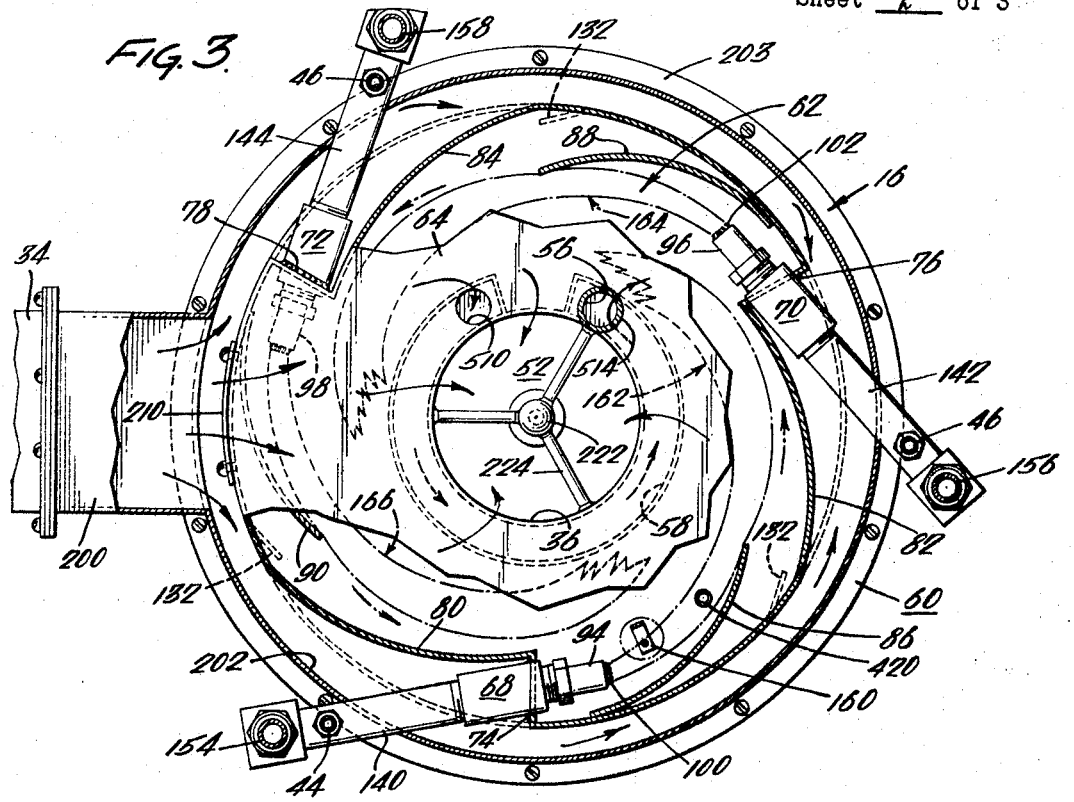
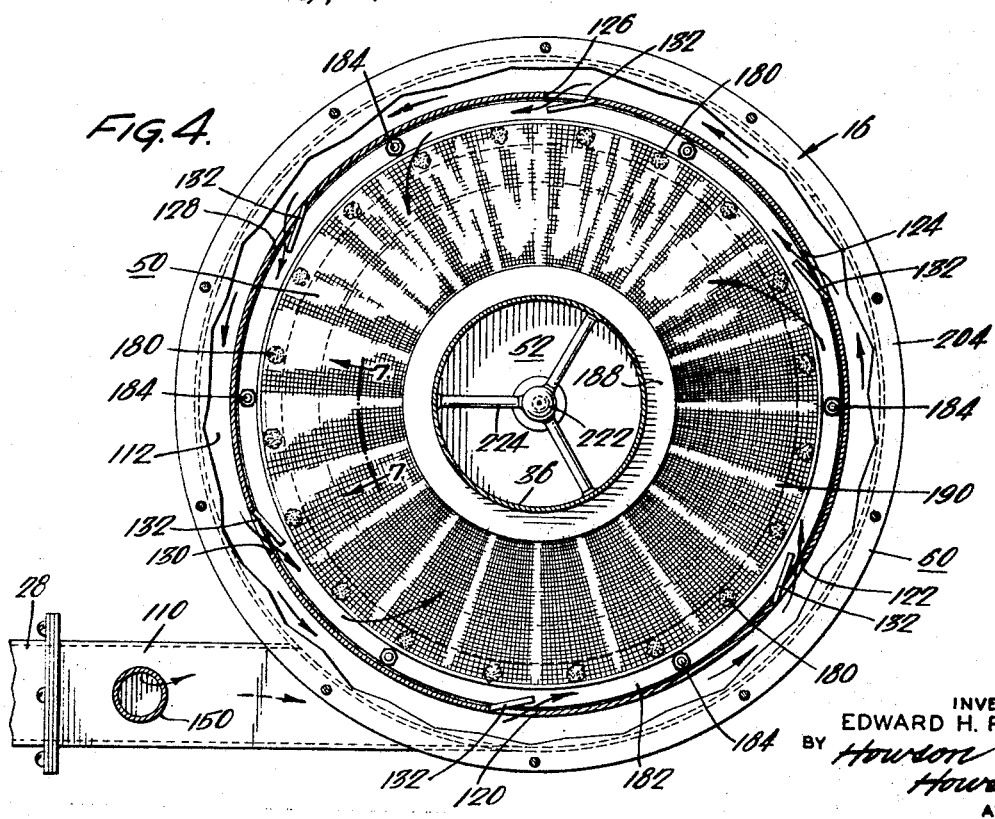

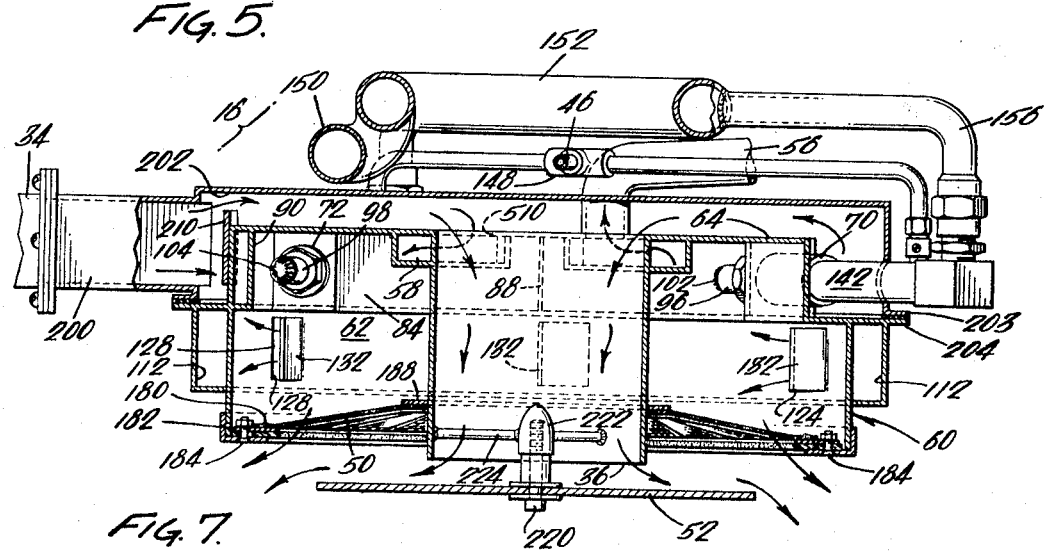
FIG. 5.
FIG. 7.
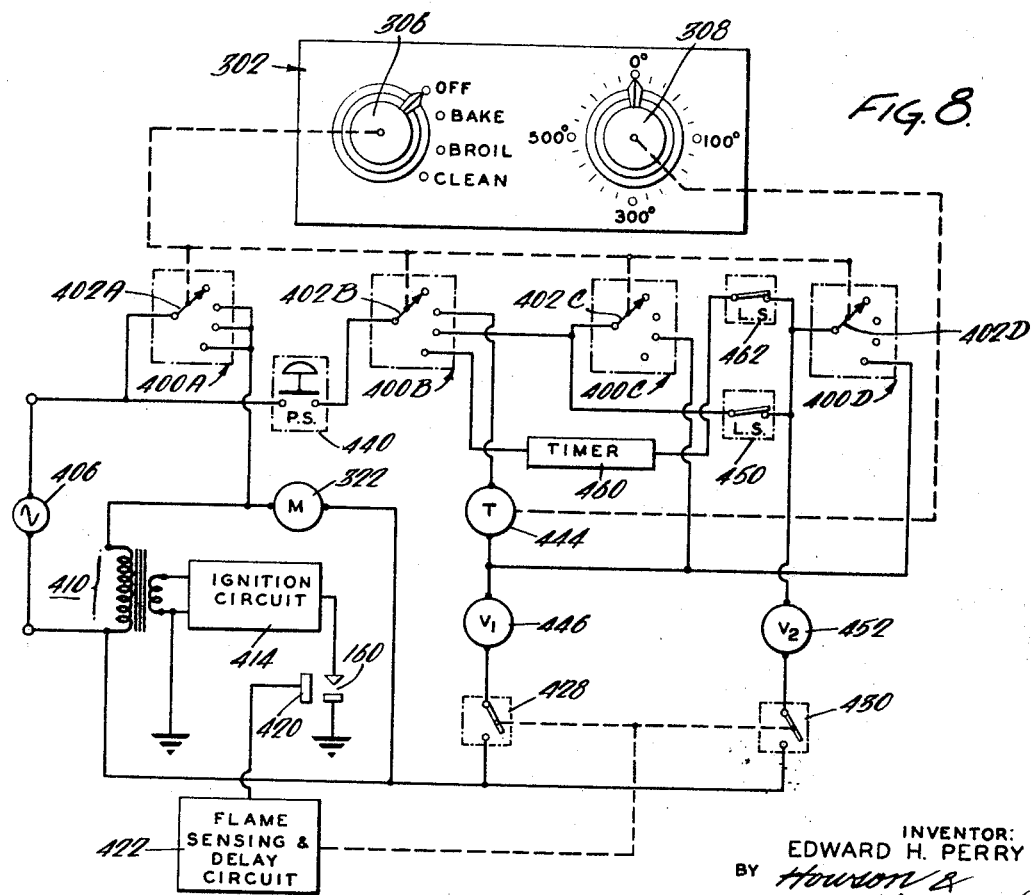
FIG. 8.
INVENTOR:
EDWARD H. PERRY
BY Howson & Howson
ATTYS.

United States Patent Office 3,437,085
Patented Apr. 8, 1969

3,437,085
SELF-CLEANING GAS OVEN SYSTEM AND GAS BURNER MEANS THEREFOR
Edward H. Perry, Parma, Ohio, assignor to American Gas Association, Inc., New York, N.Y., a corporation of New York
Filed Mar. 1, 1967, Ser. No. 619,635
Int. Cl. A21b 1/02; F24c 15/32; F23n 1/00
U.S. Cl. 126—21
14 Claims

ABSTRACT OF THE DISCLOSURE

A gas-fired cooking oven using a single forced-draft, swirl-type burner at the top of the oven cavity to produce heat for baking, roasting, broiling and pyrolytic cleaning of the oven. A plurality of gas nozzles direct a mixture of primary air and gaseous fuel around the combustion chamber in a common rotational sense, and secondary air is supplied under pressure by way of slots in the sidewalls of the combustion chamber downstream of the gas nozzles to produce satisfactory combustion. The open bottom end of the combustion chamber is covered with a radiant screen, and communicates with the top of the oven cavity. By switching the number of nozzles to which gaseous fuel is supplied, the burner is operable selectively at a lower heating level for baking or roasting, or at a higher heating level for broiling or pyrolytic cleaning with the screen heated to radiance. A blower arrangement beneath the oven cavity supplies the primary and secondary air for the burner, and also recirculates the oven gases from an opening in the bottom of the oven to the top of a conduit which extends downwardly through the center of the burner back in to the top of the oven cavity. A vent duct passes through the burner so that smoke and odoriferous vapors are oxidized and thereby eliminated from the effluent oven gases. This system reduces the quantity of hot gases released to the room, is efficient, compact and versatile, and provides a relatively short pyrolytic cleaning cycle.

Background of the invention

Food soils deposited on the walls of an oven during cooking are difficult to remove by hand, particularly when they have been "baked on" by subsequent use of the oven. However, it has been found that if the oven temperature is raised to a sufficiently high value—well above the temperatures of normal cooking and roasting—and left there for a sufficient period of time, the food soils will be incinerated to leave only a powdery ash which can be easily removed. This process is now generally designated as pyrolytic cleaning. In the case of electric ovens, pyrolytic cleaning has been achieved by use of electric oven-heating elements to provide the necessary high temperatures.

In the case of gas-fired ovens it has been found that pyrolytic cleaning can be produced by operating the usual type of gas oven at higher-than-normal heating levels. However in a gas oven, as opposed to an electric oven, it is important to provide a sufficient flow of fresh combustion air to the burners, lest incomplete combustion occur. Such a fresh air supply is normally provided by ordinary convection currents, by permitting fresh air to be admitted by way of an oven inlet opening and permitting hot oven gases to be discharged through an outlet or vent opening near the top of the oven. The rate at which such air enters the system is typically several times the rate at which air is actually used by the burners, because a large proportion of the admitted air flows out of the vent opening without entering the flame zone of the burners. The amount of air so admitted to the oven which is in excess of that required for complete combustion, expressed as a percentage of the amount required for complete combustion, is designated as the excess air percentage. Since the rate of flow of hot oven gases from the vent to the exterior is substantially the same as the rate of influx of fresh air, increases in percentage of excess air correspond to increases in rate of release of hot oven gases to the room containing the oven. When using a conventional type of gas oven for pyrolytic cleaning, the large amount of combustion air required for high-level heating of the oven cavity, the large percentage of excess air required, and the high temperature of the oven gases produced during pyrolytic cleaning, combine to produce a high total heat release to the room due to the relatively large flow of very hot effluent oven gases from the vent. This has placed the pyrolytic gas oven at a disadvantage with repect to the pyrolytic electric oven, since the user of the gas oven would have to accept a relatively high rate of heat release to the room or else place the oven in a location in which it could be vented to a remote point, such as outdoors.

Accordingly it is an object of the invention to produce a new and useful gas-fired oven capable of providing pyrolitic cleaning.

Another object is to provide such an oven for which the heating of the environment of the oven by effluent vent gases is substantially reduced.

Other objects of the invention, achieved in various embodiments thereof, include the provision of such an oven system which is compact, easy to control, versatile, capable of providing rapid cooking and thawing, efficient in its use of gaseous fuel, simple to use, and capable of eliminating undesired gas-borne contaminants such as vapors from the vented oven gases without requiring catalytic screens or the like.

Summary of the invention

In accordance with the invention, these and other objects are achieved by the provision of an oven system in which heating of the oven cavity is provided by a gas-fired forced-draft burner means supplied with a pressurized flow of fresh secondary air, vent means also being provided for permitting discharge of the hot oven gases. The forced-draft gas burner means permits efficient mixing of the fresh secondary air with the gaseous fuel, so that the percentage of excess air required is greatly reduced, with resultant decrease in the heat released by the vented oven gases. Preferably the heated oven gases are recirculated through the oven by a forced-air recirculation system, which not only improves the uniformity of distribution of the hot gases within the oven cavity but also improves the efficiency of transfer of heat from the burner to the oven gases and thence to the product to be heated in the oven, thus making possible more rapid cooking and thawing for a given burner heating rate.

The burner is preferably of a swirl type which produces an annular flame region of relatively small height, and is preferably mounted above the oven cavity to communicate with the top thereof. In the preferred embodiment the burner includes radiant screen means over its lower open end so that the burner can be operated at a lower level for ordinary baking and roasting operations with the screen non-radiant, and can be operated at a higher level for which the screen becomes radiant to provide broiling or pyrolytic cleaning. Preferably the burner includes a plurality of gas nozzles emitting gaseous fuel into a generally cylindrical combustion chamber in a common rotational sense, the number of such nozzles which are supplied with the gaseous fuel being changed in order to change the level of operation of the burner.

Secondary air is preferably introduced by way of a series of slots spaced around the periphery of the burner below the plane of the gas nozzles.

In accordance with another feature of the invention, a recirculation conduit extends through the burner along the axis thereof, through which the recirculating oven gases pass; for example, preferably the over gases are withdrawn from the lower portion of the oven cavity by blower means located beneath the oven cavity and delivered by the blower means to the upper end of the recirculation conduit and thence back into the top of the oven cavity. The swirling-flame burner produces a flame pattern which is confined to an annular region, thereby inherently providing a central region in the burner suitable for receiving the conduit through which recirculation of oven gases takes place, and at the same time providing useful heating of the sides of the recirculation conduit so as to provide further efficient heating of the recirculating oven gases.

The burner means preferably also includes a manifold arrangement for receiving the recirculating gases from the oven cavity and causing them to flow along the hot top surface of the burner means before passing into the recirculation conduit, thereby further heating the recirculating gases. Preferably also, both the secondary air and primary air for the burner are delivered from a common fresh-air blower, which may be driven by the same motor which drives the recirculation blower.

As a further feature, a vent duct is provided which has its inlet in the recirculation path and which extends through a portion of the burner so that the outside of the vent duct is scrubbed by the burner flame; in this way the temperature in the vent duct is increased to the point where any undesirable smoke or odoriferous vapors in the vent gases are oxidized and substantially eliminated from the effluent gases, without requiring the use of a catalytic element.

*Brief description of figures*

These and other objects and features of the invention will be more readily understood from a consideration of the following detailed description, taken in connection with the accompanying drawings, in which:

FIGURE 1 is a sectional elevation view of a gas cooking range embodying the invention;

FIGURE 2 is a plan view of the gas burner utilized in the embodiment of FIGURE 1;

FIGURE 3 is a sectional view taken along line 3—3 of FIGURE 1;

FIGURE 4 is a sectional view taken along lines 4—4 of FIGURE 1;

FIGURE 5 is a sectional elevation view of the gas burner arrangement utilized in the embodiment of FIGURE 1;

FIGURE 6 is a sectional view taken along lines 6—6 of FIGURE 1;

FIGURE 7 is a fragmentary enlarged view of a portion of a screen utilized in the embodiment of FIGURE 1; and FIGURE 8 is a schematic diagram illustrating one possible control arrangement for the oven of FIGURE 1.

*Description of the preferred embodiment*

Referring now by way of example only to the particular embodiment of the invention shown in the drawings, and first especially to FIGURE 1, there is provided an oven cabinet 10 containing an oven cavity 12 defined by top, bottom, side and back walls and a front wall formed by a sealed door 14. Forced-air gas burner means 16 is mounted on cabinet 10 above over cavity 12 and communicates with the top of the oven cavity by way of an opening 18 in the top of the cavity. Appropriate insulation such as 13 thermally insulates the oven cavity and burner means from the exterior. Secondary air for the burner is drawn in through louvers 20 at the bottom of the cabinet by the impeller 22 of gas-moving system 24 situated beneath the oven cavity, and is delivered to the burner means 16 by way of duct 28. The same duct 28 supplies primary air for mixing with the gaseous fuel for the burner, as will be described later herein. Another impeller 30 withdraws air from the bottom of the oven cavity 12 by way of a central circular opening 32 in the oven bottom and delivers it by way of duct 34 to a recirculation conduit 36 which extends from above the burner means 16 through the center of the burner means to the upper part of the oven cavity.

Gaseous fuel, such as natural gas, is supplied to the oven system through gas line 40 and passes through a control box 42 to be delivered to either gaseous-fuel supply line 44 alone or to both line 44 and gaseous-fuel supply line 46. Supply line 44 is utilized alone when the burner means is to be operated at its lower level for baking or roasting, and both lines 44 and 46 are utilized when broiling or pyrolytic cleaning is to be provided. Suitable control means to be described hereinafter are mounted on the upper front of the cabinet and cooperate with elements in control box 42 to provide the desired coordination of the operation of the gaseous fuel supply lines with the various other elements of the oven, and to provide selection of the baking or roasting, broiling, or pyrolytic cleaning operations.

As indicated by the curved arrows in the figures, air entering the cabinet by louvers 20 is delivered to the burner means 16, part of the air then being mixed as primary air with gaseous fuel from lines 44 and 46, and the remainder supplied as forced-draft secondary air to burner 16 to produce a hot swirling flame within the burner means, which causes heater air to flow downwardly through a screen 50 into the oven cavity 12; from the oven cavity the hot oven gases flow by way of opening 32 and impeller 30 to the recirculation duct 34 and back into the top of oven cavity 12 by way of recirculation conduit 36. A dispersing plate 52 is mounted adjacent, and in closely confronting relation to, the lower open end of the recirculation conduit 36 to intercept the recirculated oven gases and to enhance their uniform distribution through the oven cavity. Vent louvers 54 in front of the cabinet are connected by a vent pipe 56 to a specially-arranged vent duct 58 to be described hereinafter, which picks up a fraction of the recirculated oven gases, passes them through a heated zone, and permits them to be discharged from the vent louvers 54. With this general circulation pattern in mind, the structural details of the various elements and their operation will now be described.

Considering first the details of the burner means employed, and referring particularly to FIGURES 1 and 3 through 5, a burner head 60 defines a generally cylindrical combustion chamber 62 therein, the upper end of which chamber is closed by a top wall 64 and the lower end of which is open except for the screen 50 extending across the bottom opening of the burner head between the sidewalls of the combustion chamber and the sidewalls of the conduit 36. The recirculation conduit 36 is a cylindrical tube or stack, arranged concentrically with the combustion chamber 62, which starts at the top wall 64 of the burner head and terminates in the oven cavity slightly below the screen 50. The region between the recirculation conduit 36 and the sidewalls of the combustion chamber therefore constitutes an annular space in which a swirling flame is produced by the burner means. All parts of the burner head, its contents and associated parts are preferably of a suitable metal.

More particularly, three gas nozzles 68, 70 and 72 extend into the annular combustion chamber to direct a gaseous fuel mixture in the same rotational sense around the chamber 62, namely counter-clockwise as viewed in FIGURE 3. The nozzles 68, 70 and 72 are mounted by welding them at 74, 76 and 78 to respective supporting channels 80, 82 and 84 formed in the sidewalls of the combustion chamber. The inner sidewall of each of the latter supporting channels is preferably curved inwardly, from the sidewall of the combustion chamber to the interior edge of the associated gas nozzle, so as to enhance the smooth circular flow of the gaseous fuel, air and flame within the combustion chamber. To further enhance the smooth swirling action there are also employed three corresponding curved deflectors 86, 88 and 90, each of which is welded to the sidewall of the combustion chamber adjacent one of the nozzles and is curved inwardly so as to intercept flame projected forwardly by the corresponding associated nozzle. To aid in retaining the flame at each nozzle output, the orifices 94, 96 and 98 of nozzles 68, 70 and 72, respectively, may be provided with appropriate flame-retaining means, which may for example be screens or, as in the present case, may comprise cylindrical wire meshes 100, 102 and 104, respectively, rolled up and inserted into the open ends of orifices 94, 96 and 98, respectively, the axially extending wires of the mesh protruding from the ends of the orifices and preferably being bent into a converging shape as shown.

Burner head 60 also comprises an inlet duct 110 supplied with secondary air from secondary air duct 28 for supplying said secondary air to a secondary-air manifold 112 in the form of an annular chamber integral with and surrounding the combustion chamber below the plane of the gas nozzles. A plurality of narrow rectangular slots 120, 122, 124, 126, 128 and 130 extend through the sidewalls of the combustion chamber and communicate with the secondary-air manifold 112 at equal angular intervals around the combustion chamber. Each of these slots is provided with a tab or vane such as 132 having one edge secured to the combustion chamber sidewall along the entire edge of the corresponding slot, on the side of the slot which is upstream with respect to the circulating air and gases in the combustion chamber. Each such vane is slanted along the direction of motion of air and gas in the combustion chamber and serves to direct the secondary air from the secondary-air manifold 112 into the combustion chamber circumferentially, in the same common sense as the above-described flow of primary air, gaseous fuel and flame; the vanes 132 may, for example, be produced simultaneously with production of the slots by punching them inward from the sidewalls of the combustion chamber. The secondary air thereby injected provides a strong swirling motion of the air-gas-flame mixture in the combustion chamber and satisfactory combustion in the region above screen 50. Swirl-type burners using secondary-air inlet slots downstream of a fuel nozzle are described and claimed in the copending application Ser. No. 619,797, of Earl J. Weber and Bernard G. Honaker, Jr., filed Mar. 1, 1967 and entitled "Burner of Gaseous Fuel and Apparatus Embodying Same," said Weber and Honaker application being of common assignee herewith.

The desired mixture of primary air and gaseous fuel for the burner nozzles 68, 70 and 72 is produced in mixing tubes 140, 142 and 144, respectively, which are threaded into and supported by the inlet ends of their corresponding nozzles. As is best shown in FIGURE 2, the gaseous fuel supply line 44 is connected into only mixer tube 140, while the other gaseous supply line 46 is connected through a T joint 148 to both of the mixer tubes 142 and 144. It is understood that lines 44 and 46 preferably pass upward from below the oven cavity through the oven insulation to protect them from the oven heat. Primary air for all three burner nozzles is supplied from secondary-air inlet duct 110 by way of pipe 150, distributing manifold pipe 152 and the individual primary-air supply pipes 154, 156 and 158. In the present arrangement, primary air is supplied to each of the gas nozzles so long as the blower impeller 22 is operating. When the burner is to be operated at a relatively lower level for baking and roasting purposes, gaseous fuel is supplied only to line 44, hence only to burner nozzle 68, while for boiling or pyrolytic cleaning purposes fuel is supplied to both lines 44 and 46 so that all three nozzles are supplied with fuel.

A conventional spark plug 160 suitable for electrical ignition is mounted on the top of the burner head 60 with its spark electrodes positioned adjacent the orifice of burner 68, so that when ignition voltage is supplied to the spark plug, and when gaseous fuel and primary and secondary air supplies are operating, the flame represented at 162 (FIGURE 3) will be formed in a position extending from the orifice 94 counter-clockwise around the combustion chamber. When the air and gas supplies for the other nozzles are turned on, flame 162 will produce ignition for the other nozzles, resulting in the production of the corresponding flames 164 and 166.

It is noted that the secondary-air inlet 110 joins secondary-air manifold 112 at an angle such that the secondary air travels counter-clockwise in manifold 112, so as to facilitate entrance of secondary air into the slots 120, etc. The result of the operation of the above-described burner arrangement is therefore to produce a hot swirling flame around the recirculation conduit 36 and above the screen 50. The forced-air flow through the burner chamber causes the resultant heated air to move downwardly to, and through, the screen 50 and into the oven cavity 12. When all three burners are operating, the heat produced is sufficient to cause the screen 50 to become radiant, as desired for broiling and pyrolytic-cleaning operations.

Screen 50 may be a stainless steel 40-mesh screening, spot-welded around its periphery, as at 180 (FIGURE 4), to a ring-shaped supporting plate 182, which in turn is secured to the lower end of the burner head by bolt-and-nut arrangements such as 184. The inner end of screen 50 is spot welded to an inner supporting ring 188 which fits about the circumference of the recirculation conduit 36. As is shown particularly clearly in FIGURE 7, the screen 50 may be provided with a plurality of radially-extending crimped ridges such as 190 which provide stiffening for the screen and tend to ease thermal stresses produced by heating and cooling of the screen.

Recirculation air from duct 34 is delivered to the duct 200 of a generally-cylindrical recirculation manifold 202, best shown in FIGURES 3 and 5, which extends around and over the top wall 64 of the combustion chamber. Manifold 202 is provided with a peripheral flange 203 which is bolted to a corresponding peripheral flange 204 on burner head 60. Where manifold 202 encounters various elements protruding from the burner head 60, it is cut out to encompass such elements and fitted to provide a substantially gas-tight seal to them. The recirculating oven gases are delivered by manifold 202 around the edges of the top of the burner head 60 and are constrained to travel along the top thereof before passing into the upper end of conduit 36. To enhance this action and minimize direct flow from inlet duct 200 to conduit 36, a diffusing wall-member 210 is preferably bolted to the outer sidewall of the burner head 60 in line with inlet 200, the diffusing wall-member 210 extending above the top of the burner head in the path of direct flow from inlet duct 200 to the conduit 36. The recirculated air is thereby heated by the hot outer surface of the burner head and is additionally heated by the hot conduit 36.

The deflector plate 52, which is preferably of a high-temperature glass but may in some cases be of metal, is mounted concentrically with the recirculation duct 36 by means of a bolt 220 (see FIGURE 5) threadingly engaging a supporting body 222, which in turn is supported by a three-legged spider 224 secured to the inner walls of conduit 36.

The opening 32, provided in the bottom of the oven for recirculation purposes, is preferably a relatively large circular aperture, communicating with the interior of an underlying sealed pan 230 (see FIGURE 1) which communicates also with the inlet 232 to the impeller 30 but is otherwise closed, so that a positive draft of air is withdrawn from the bottom of the oven cavity for recirculation to conduit 36.

Appropriate insulation 13 is provided just below pan 230, and it will be understood that the oven cavity, burner means and circulation systems described above are sealed against gas or air leakage with the exception of the provision of fresh air to impeller 22 and the discharge of vent products from vent louvers 54.

Appropriate operator controls are provided on the upper front panel 300, and various automatic controls and safety devices suitable for use in such an oven are preferably also employed. Since appropriate forms and interconnections of such manual control and automatic control elements are well known, their nature will not be described herein in great detail. The necessary control circuits and devices may be contained in the control box 42 and in the control box 302 mounted on the back of the control panel 300. These boxes are interconnected by an electrical cable 303, and electrical power is supplied to control box 42 by line cord 304. The manual controls on the front of the control panel 300 include a manual operation-selector knob 306, which can be set to an OFF position, a BAKE position, a BROIL position or a CLEAN position to produce the corresponding functions (see FIGURE 8), and the manually-operable thermostat control knob 308 can be adjusted to provide the desired baking or roasting temperature when the selector knob 306 is in the BAKE position. These settings are the only operations required of the operator of the oven.

FIGURE 8 shows one arrangement of control circuit which can be employed. Operation-selector knob 306 is mechanically ganged to each of the four rotary switch sections 400A, 400B, 400C and 400D to rotate the rotary switch arms 402A, 402B, 402C and 402D of the respective switch sections sequentially to each of four contact position thereof in synchronism with knob 306. With the selector knob 306 in the OFF position all four of the rotary switch arms are in the position shown, in which position they are all connected to unconnected contacts of their respective switch sections. Under these conditions the line-voltage source 406 is open-circuited, and all electricity and fuel to the oven system are cut off.

When selector 306 is turned to any of the BAKE, BROIL or CLEAN positions, the arm of switch section 40A is connected to the second, third or fourth contacts thereof, all of which contacts are connected together. One side of source 406 is permanently connected to the arm of switch section 400A, and the other side of source 406 is connected by way of the primary of isolation transformer 410 to the interconnected contacts of switch section 400A. Accordingly, turning knob 306 to any of the BAKE, BROIL or CLEAN positions applies an alternating current to the primary of transformer 410, the secondary of which then operates an ignition circuit 414 to apply ignition voltage to ignition spark plug 160 to light the burner. A flame electrode 420, positioned in the flame zone for flame 162 (see FIGURES 1 and 3) senses the presence or absence of the flame 162 and is connected to flame-sensing and delay circuit 422; the flame electrode may be of the type which contacts the flame to sense its electrical properties or may be a mechanical flame switch element which expands in response to heating by the flame to open or close switch contacts. The flame sensing and delay circuit 422 may take any of a variety of known forms, and operates to close relays 428 and 430 only for a predetermined short delay interval after knob 306 is turned to one of its ON positions, unless flame 162 appears during said delay interval in which case relays 428 and 430 remain closed until the flame disappears.

Blower motor 322 is also connected across the line voltage source 406 whenever knob 306 is turned from its OFF position, so that primary and secondary air and recirculation air are delivered to the system as described above. A pressure switch 440 mounted on duct 28 closes in response to the rise of pressure in duct 28 when motor 322 operates, but opens when motor 322 is not operating. As will become apparent, this prevents the supply of gaseous fuel to the burner unless primary and secondary air are also being supplied to the burner to provide satisfactory combustion of the gaseous fuel.

The rotary arm of switch section 400B is connected to the fixed contact of pressure switch 440. Accordingly when selector knob 306 is turned to the BAKE position, the arm of switch section 400B is moved to its second contact and thereby applies line voltage to the series combination of oven thermostat 444, electrically-operated gas-control valve 446 and the contacts of relay 428. Valve 446, when supplied with current, opens to supply gaseous fuel to line 44 for burner nozzle 68. Oven thermostat 444 is adjustable as to its opening temperature by adjustment of knob 308 in the usual way. Accordingly, when flame is present and the blower motor operating, turning selector knob 306 to its BAKE position causes gaseous fuel to be supplied to burner nozzle 68 to produce the single flame 162 for baking, subject to turning on and off of the flame thermostatically to maintain the selected oven temperature.

When selector knob 306 is turned to the BROIL position, the arm of switch section 400B moves from its second contact position to open the above-described BAKE circuit, and moves to its third position in which it is connected directly to the arm of switch section 400C. The third position of switch section 400C is the only one for which a contact connection is provided. The third contact of switch section 400C is connected to the series combination of valve 446 and relay 428 so that burner 68 is continuously supplied with gaseous fuel, oven thermostat 444 now being ineffective. In addition, in the BROIL condition the arm of switch section 400B connects thermal limit switch 450, electrically-operated gas-control valve 452 and the contacts of relay 430 across the line voltage source 406, so that gaseous fuel is then delivered also by line 46 to burner nozzles 70 and 72, and all three flames are thereby produced for broiling. Limit switch 450, mounted on the oven wall and shielded from direct radiation from screen 50, opens when its temperature is above about 600° F. and turns off burner nozzles 70 and 72 as a protection against overheating of the oven if broiling is accidentally prolonged for any reason.

Switch section 400D has only its fourth contact connected, and hence has no effect until pyrolytic cleaning is instituted. When selector knob 306 is turned to the CLEAN position, switch section 400C is effectively disconnected and releases valve 446, while switch section 400B releases valve 452. However, the fourth contact of switch section 400B now supplies line voltage to the series combination of timer 460, thermal limit switch 462, valve 452 and the contacts of relay 430, so as to supply gaseous fuel to burner nozzles 70 and 72; and also supplies line voltage to the series combination of timer 460, limit switch 462, the arm and fourth contact of switch section 400D, valve 446 and the contacts of relay 428 to suply gaseous fuel to burner nozzle 68. With all of these connections closed then, all three flames operate for pyrolytic cleaning. Limit switch 462 is mounted in a shielded position in the oven cavity, and opens to cut off burner nozzles 70 and 72 if the temperature in the oven for any reason rises above a predetermined upper limit such as 1050° F. during pyrolytic cleaning; when the oven temperature falls below the predetermined limit, e.g. 1050° F., all three burner nozzles again become operative.

Timer 460 is started by the turning of the selector knob to the CLEAN position, and opens the circuit after a time determined to be sufficient for pyrolytic cleaning, e.g. one hour. When the timer opens its contacts, all three burner nozzles are shut down. The timer may be of an automatically-resetting type.

Various other control and safety features may also be employed. For example, the door 14 is preferably provided with a manual draw-in type latch to assure a firm oven seal and prevent inadvertent opening of the door. Preferably the door latch includes a thermal lock, such that the door is locked shut whenever the oven temperature exceeds a predetermined value higher than the normal broiling temperature, for example, if the broiling-temperature limit switch 450 operates at 600° F. the thermal lock may operate at 700° F.

In the operation of the oven then, if baking or roasting is desired the door 14 is opened and the food product placed on one of the shelves 500 in the oven and the door reclosed. The selector switch 306 is turned to the BAKE position. Common blower motor 322 then begins to operate, turning both of the impellers 30 and 22 so as to provide primary and secondary air to the burner means 16, and more particularly to each of the three nozzles 68, 70 and 72 thereof. Gaseous fuel is then supplied over line 44 to gas nozzle 68 only, and the ignition plug 160 operates to ignite the air-gas mixture emanating from nozzle 68. The resultant flame swirls around the combustion chamber between the conduit 36 and the inner walls of the combustion chamber above the screen 50, producing heated air which is forced downwardly and through the screen 50 into the oven cavity 12 by the combined action of the primary and secondary air and the suction exerted by the impeller 30. The downward flow travels against and around the food product on the rack, and exits through the opening 32 into the pan 230 and, by way of the inlet orifice 232, into impeller 30. From there, the hot oven gases are recirculated through duct 34 to the inlet 200 of the recirculation manifold 202, whence they enter the top of the recirculation duct 36 and pass downwardly from duct 36 into the top of the oven cavity, where they are dispersed by the deflecting plate 52.

A relatively minor percentage of the recirculated air passes into the inlet 510 of the vent duct 58 (see FIGURES 3 and 5), and travels through a generally circular portion of the latter duct which is scrubbed at its outer walls by the burner flame. The vent gases then travel from the outlet 514 of the vent duct 58 to the vent pipe 56 and the vent louvers 54, whence the hot gases are discharged.

The deflection plate 52 serves to prevent downward flow of hot recirculated gases in a concentrated pattern in the middle of the oven. The entire recirculation system assures an even distribution of heat within the oven cavity and, because of the flow of the hot oven gases over the surfaces of the food product, enables more rapid cooking or thawing than is ordinarily obtainable.

For broiling, the selector switch 306 is turned to the BROIL position, which, as described above, turns on all three of the flames in the burner so as to produce a high level of heating which heats the screen 50 to radiance. Food products placed on the upper rack of the oven are then subjected to efficient broiling. The circulation of air and of hot oven gases is the same as described previously with respect to the bake cycle. However, in this case the variable thermostatic control 444 is not utilized, and instead the simple temperature-actuated limit switch 450 is utilized to cut off the supply of gaseous fuel to two of the burner nozzles should the oven temperature become too high due to accidentally-prolonged broiling operation.

For pyrolytic cleaning, the selector switch 306 is turned to the CLEAN position, and the oven system operates in the same manner as for broiling, with the exception that the upper temperature limit switch 450 is no longer effective and the temperature is allowed to rise to pyrolytic cleaning temperatures of 1000° F., or even slightly higher. The timer permits this temperature condition to persist for a period long enough to produce the desired pyrolytic cleaning, for example an hour. Any odoriferous or vaporous products produced in the recirculation stream and reaching the vent duct 58 are effectively oxidized due to the high temperature produced by the scrubbing of the exterior of the vent duct by the burner flame. After the preset time for pyrolytic cleaning, all burners are automatically shut off by the timer.

Without in any way thereby limiting the scope of the invention, the following examples of flow conditions utilized in one particular application are as follows. Primary air flow was at the rate of 87 cubic feet per hour and secondary air flow was at a rate of 335 cubic feet per hour. The recirculation air flow was at the rate of approximately 3800 cubic feet per hour, or of the order of nine or ten times the combined primary and secondary air flow. Using natural gas, the burner input rate for each gas nozzle was about 11,000 B.t.u.'s per hour, and the pyrolytic oven-cleaning temperature about 1000 to 1050° F. In this example the oven was 20 inches deep, 17 inches wide, and 15 inches high. The recirculation duct 36 was 4 inches in diameter, and the open portion of of screen 50 had an outer diameter of 10 inches and an inner diameter of 5 inches. The baffle 52 was 8¼ inches in diameter and one-half inch below conduit 36. The height of the portion of the recirculation conduit above the burner head was about ¾ inch, the outer diameter of the burner head about 13 inches, and the width of the passage in secondary-air manifold about ¾ inch.

It is recognized that many other types of operation of the same basic equipment may be employed in certain cases. For example, pyrolytic cleaning can be accomplished at a somewhat lower temperature if longer time periods of cleaning are acceptable. Further, if desired the rate of supply of primary and secondary air to the burner means can both be reduced when operating in the baking or roasting mode, since the supply of air utilized for broiling and pyrolytic cleaning is in excess of that required for baking or roasting. Also, the recirculation rate can be subjected to control for different purposes; for example, higher speeds of recirculation may be used in the reheating of frozen foods, while for cooking certain large food products or certain selected foods, lower recirculation rates may be used to secure optimum appearance and surface texture for the food. In such cases separate drives will be employed for the recirculation blower and for the primary and secondary air blower.

Further, in the form of the invention shown in the drawings a catalytic element is not utilized in the vent for the purposes of reducing objectionable smoke and odors from the vent gases. However, if it is desired to utilize such a catalytic element it may be placed in the vent duct 58; because that duct is subjected to strong heating by the burner flame itself, it will reach a sufficiently high operating temperature for catalytic action before objectionable smoke and odors have been generated by substances within the oven cavity, and hence will be in a condition to eliminate such smoke and odor by the time they reach the catalytic element, as is desired for best operation.

The resultant oven system is capable of producing pyrolytic cleaning not only faster than conventional gas ovens modified for pyrolytic cleaning, but also faster than comparable electric ovens studied. For example, heavy soil consisting of sugar juices and greases baked on oven surfaces at 400° F. for eight hours can be satisfactorily incinerated in a cleaning cycle of slightly less than one hour, including the time required for heating up the oven to 1050° F., for accomplishing the desired incineration, and for recooling the oven to 600° F.

Furthermore, the oven has been found highly efficient in the use of gaseous fuel. To accomplish the above-described pyrolytic cleaning cycle in the particular example cited, only about 21,000 B.t.u.'s are required. During the operations such as baking and thawing of frozen foods, the times required can be reduced by about one-half as compared to conventional gas ovens. Furthermore, the use of a single burner means for all operations, with relatively simple controls, makes the arrangement easy to operate.

In addition, and importantly, it has been found that the excess air utilized is only about 70%, compared with approximately 250% commonly required in conventional types of gas ovens operated to produce pyrolytic cleaning. As a result, the heat released to the room is about half that which would occur with conventional gas-oven designs. The elimination of the need for a catalytic element, and the particularly simple and effective arrangement of recirculation system, blowers and common motor also contribute to making the oven a commercially-competitive device in the pyrolytically-cleaned oven field.

If desired, the temperature reached by the oven cabinet can be reduced by providing ventilated air spaces beneath the exterior cabinet panels, and further reduced by drawing the secondary and primary air through these air spaces rather than using louvers 20 for this purpose.

While the invention has been described with particular reference to a specific embodiment thereof in the interest of complete definiteness, it will be recognized that it may be embodied in a large variety of forms diverse from those specifically described without departing from the spirit and scope of the invention as defined by the appended claims.

What is claimed is:

1. An oven system, comprising:
   means defining an oven cavity for receiving objects to be heated;
   forced-draft gas-burner means communicating with said oven cavity and operable to produce pyrolytic-cleaning temperatures in said cavity;
   fresh air inlet means and gas-moving means for supplying a pressurized flow of secondary air to said burner means;
   vent means for enabling an efflux of oven gases from said oven cavity to the exterior of said oven system;
   conduit means passing through the center of said gas-burner means; and
   blower means for recirculating oven gases through said oven cavity by way of said conduit means;
   whereby said oven cavity can be operated efficiently at pyrolytic temperatures while reducing the delivery of heat from said vent means to the surrounding environment.

2. The system of claim 1, in which said burner means comprises a swirl-type burner having a combustion chamber with its open end communicating with the top of said oven cavity, screen means beneath and adjacent said combustion chamber to be heated to radiance when said burner means is operated at a high level, said burner means comprising a plurality of nozzles for discharging gaseous fuel into said combustion chamber, said system comprising means for selectively operating different numbers of said burner nozzles to operate said burner means at different heating levels.

3. The oven system of claim 1, comprising manifold means extending around and over said burner means for conducting said recirculating oven gases and for constraining them to flow over the hot exterior of said burner means.

4. An oven system suitable for baking, roasting and broiling and adapted to be cleaned pyrolytically, comprising:
   means defining an oven cavity for receiving objects to be heated;
   a swirl-type forced-draft gas-fired burner mounted above said oven cavity to provide heating of said cavity from above, said burner being controllable to provide broiling temperatures, baking or roasting temperatures, or pyrolytic cleaning temperatures in said oven cavity as desired;
   conduit means extending through the center of said burner; and
   gas-moving means for circulating oven gases from one portion of said oven cavity through said conduit and back to another portion of said oven cavity, thereby to establish a recirculatory flow of said oven gases through said oven cavity;
   fresh air inlet means for supplying secondary air to said burner; and
   vent means for providing an efflux of gas from said oven cavity to the exterior;
   whereby said oven cavity can be efficiently heated to pyrolytic temperatures while reducing the delivery of heat from said vent means to the surrounding environment.

5. The apparatus of claim 4, in which said vent means comprises a vent conduit extending in heat-exchange relation to said burner means.

6. A cooking oven system suitable for baking, roasting and broiling and adapted to be cleaned pyrolytically, comprising:
   an oven cabinet having an oven cavity therein for receiving food products;
   gas burner means mounted on said cabinet above, and communicating with, the top of said oven cavity and controllable to provide all of the heat required for baking, roasting, broiling and pyrolytic cleaning in said cavity;
   said gas burner means comprising a generally-cylindrical heat-conductive combustion chamber having a closed upper end and an open lower end, a plurality of gas nozzles for directing gaseous fuel around the interior of said combusion chamber in a common rotational sense, and a plurality of aperture means in the sidewalls of said combustion chamber for admitting secondary air into said combustion chamber in a flow which swirls about said chamber in said sense, thereby to produce a flame in said chamber which swirls about said chamber when said gaseous fuel is ignited;
   means for igniting said gaseous fuel;
   a recirculation conduit of thermally-conductive material extending through said combustion chamber substantially coaxially with the axis of said chamber, and terminating in the uper portion of said cavity;
   screen means extending across the open face of said combustion chamber between the sidewalls thereof and the outer wall of said conduit and responsive to said burner means to become radiant when said burner means is operated in its broil condition or its pyrolytic-cleaning condition;
   first manifold means for receiving secondary air and supplying it to the outer sides of said aperture means for delivery to the interior of said combustion chamber;
   second manifold means extending around and over the top of said combustion chamber for receiving oven gases and passing them along and over the hot upper end of said combustion chamber to the open upper end of said recirculation conduit;
   gas-moving means for supplying secondary air to said first manifold means at a rate sufficient to produce substantially complete combustion of said gaseous fuel in said combustion chamber above said screen means, for supplying primary air to said gas nozzles, and for withdrawing oven gases from the lower portion of said oven cavity and delivering them to said second manifold means to establish a recirculatory flow of said oven gases through said oven cavity;
   means adjacent the lower end of said recirculation conduit for dispersing said recirculated oven gases upon their entrance into said oven cavity;
   vent means for venting oven gases from said second manifold to the exterior, said vent means comprising a vent conduit having a thermally-conductive wall extending within said combustion chamber thereby to provide additional heating of the gases vented therethrough; and
   means for controlling the number of said nozzles to which said gaseous fuel is supplied so that, when a larger number of said nozzles are supplied with said gaseous fuel, said burner means operates at a higher heating level sufficient to heat said screen means to radiance for broiling and to produce temperatures at the walls of said oven cavity sufficient for pyrolytic cleaning thereof, and so that when a lesser number of said nozzles are supplied with said gaseous fuel said burner means operates at a lower level to provide temperatures in said cavity suitable for baking or roasting.

7. The oven system of claim 6, in which said aperture means comprises slots spaced around, and extending through, the sidewalls of said combustion chamber below said nozzles, and vanes each extending along the interior edge of one of said slots for directing said combustion air in said rotational sense about said combustion chamber.

8. The oven system of claim 6, in which said dispersing means comprises a plate mounted in said oven cavity in spaced confronting relation to the lower end of said recirculation conduit.

9. The oven system of claim 6, in which said gas nozzles are spaced equiangularly about said combustion chamber and said aperture means are also spaced equiangularly about said combustion chamber.

10. The oven system of claim 6, in which the bottom wall of said oven cavity is provided with an opening through it; in which said gas-moving means comprises first blower means beneath said oven cavity for withdrawing oven gases from said oven cavity by way of said opening and delivering them to said second manifold means, second blower means for drawing in fresh air and delivering it to said first manifold and to said nozzles, and a single motor for operating both said first and said second blower means.

11. The oven system of claim 6, comprising means for shutting off the flow of said gaseous fuel to said nozzles in response to a rate of air flow to said first manifold means which is substantially below a predetermined normal flow rate.

12. The oven system of claim 6, comprising control means for actuating said gas-moving means and for operating said burner means selectably at said higher or said lower level, and thermostatic means for controlling said burner means to maintain said oven cavity at selectable temperatures.

13. A gas burner assembly, comprising:
a burner head having therein a generally-cylindrical combustion chamber closed at one end and open at the other;
a plurality of gas nozzles mounted on said head for directing gaseous fuel around said chamber in a common rotational sense;
a first manifold extending about the exterior of said chamber below said nozzles and having an inlet duct for receiving combustion air;
a plurality of slot means, extending through the sidewalls of said chamber and communicating with said first manifold, and configured to direct air from said first manifold into said combustion chamber circumferentially and in said rotational sense;
a conduit extending through said combustion chamber from said closed end to said open end thereof;
a second manifold means over the upper end of said chamber of said conduit for receiving gases for delivery to said upper end of said conduit; and
screen means extending across the open end of said combustion chamber.

14. The burner assembly of claim 13, comprising a duct in said combustion chamber communicating at one end with said second manifold and at its other end with the exterior, said duct extending around said conduit in said combustion chamber.

References Cited

UNITED STATES PATENTS

| | | | |
|---|---|---|---|
| 2,509,679 | 5/1950 | Evans | 236—15 |
| 2,524,272 | 10/1950 | Sage | 126—19 X |
| 3,160,153 | 12/1964 | Drayer. | |
| 3,169,871 | 2/1965 | Macchi et al. | |
| 3,364,912 | 1/1968 | Dills et al. | |

FREDERICK KETTERER, *Primary Examiner.*

U.S. Cl. X.R.

236—15; 431—115, 171, 173, 347